(12) United States Patent
Ando

(10) Patent No.: US 12,431,021 B2
(45) Date of Patent: Sep. 30, 2025

(54) ELECTRONIC CONTROL DEVICE AND VEHICLE CONTROL SYSTEM

(71) Applicant: HITACHI ASTEMO, LTD., Hitachinaka (JP)

(72) Inventor: Koichi Ando, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 297 days.

(21) Appl. No.: 17/785,783

(22) PCT Filed: Dec. 15, 2020

(86) PCT No.: PCT/JP2020/046665
§ 371 (c)(1),
(2) Date: Jun. 15, 2022

(87) PCT Pub. No.: WO2021/145120
PCT Pub. Date: Jul. 22, 2021

(65) Prior Publication Data
US 2023/0055023 A1  Feb. 23, 2023

(30) Foreign Application Priority Data
Jan. 17, 2020 (JP) .................. 2020-005858

(51) Int. Cl.
G08G 1/16 (2006.01)
G01C 21/00 (2006.01)

(52) U.S. Cl.
CPC ........... G08G 1/16 (2013.01); G01C 21/3807 (2020.08)

(58) Field of Classification Search
None
See application file for complete search history.

(56) References Cited

U.S. PATENT DOCUMENTS

2006/0142940 A1* 6/2006 Choi ................. G01C 21/26
701/417
2009/0153362 A1* 6/2009 Goto ................. G09B 29/006
340/932.2
(Continued)

FOREIGN PATENT DOCUMENTS

JP 2017-068589 A 4/2017
JP 2018-124416 A 8/2018
(Continued)

OTHER PUBLICATIONS

Office Action issued in corresponding Chinese Patent Application No. 202080083835.1, dated Jul. 18, 2023 (8 pages).
(Continued)

Primary Examiner — Peter D Nolan
Assistant Examiner — Jacob Kent Besteman-Street
(74) Attorney, Agent, or Firm — Foley & Lardner LLP

(57) ABSTRACT

Provided are an electronic control device and a vehicle control system capable of reducing a calculation amount and improving reliability of a travel route of a vehicle as compared with a conventional course setting device. An electronic control device 200 is mounted on a vehicle 100. The electronic control device 200 includes a map processing device 210 connected to an external sensor 110 that recognizes an obstacle around the vehicle 100 and a position sensor 120 that acquires position information of the vehicle 100 in a manner capable of information communication. The map processing device 210 includes a storage device 212 that stores map information including travel route information of the vehicle 100. The map processing device 210 records a travel route along which the vehicle 100 avoids an obstacle in the storage device 212, classifies the obstacle into a permanent obstacle and a transient obstacle, and updates the travel route information with an avoiding route based on
(Continued)

the travel route along which the vehicle 100 has avoided the permanent obstacle.

7 Claims, 10 Drawing Sheets

(56) References Cited

U.S. PATENT DOCUMENTS

| | | | | |
|---|---|---|---|---|
| 2010/0121564 A1* | 5/2010 | Kobayashi | ............ | G01C 21/34 701/533 |
| 2014/0236477 A1* | 8/2014 | Chen | ............ | G07C 5/008 701/450 |
| 2017/0329331 A1* | 11/2017 | Gao | ............ | B60W 50/0098 |
| 2018/0196442 A1* | 7/2018 | Wang | ............ | G05D 1/0274 |
| 2018/0217601 A1* | 8/2018 | Marcoux | ............ | G06Q 30/06 |
| 2018/0292834 A1* | 10/2018 | Kindo | ............ | G01C 21/3415 |
| 2019/0353497 A1* | 11/2019 | Murashita | ............ | G08G 1/14 |
| 2021/0215490 A1* | 7/2021 | Mishra | ............ | G01C 21/3614 |
| 2022/0355823 A1* | 11/2022 | Tagawa | ............ | B60W 60/0015 |
| 2023/0282003 A1* | 9/2023 | Matsuo | ............ | G06V 10/25 348/148 |
| 2024/0317232 A1* | 9/2024 | Woodbury | ............ | B60W 60/001 |

FOREIGN PATENT DOCUMENTS

JP        2018-176879 A     11/2018
WO    WO-2017/057055 A1    4/2017

OTHER PUBLICATIONS

International Search Report with English Translation and Written Opinion for PCT/JP2020/046665 dated Mar. 2, 2021.

* cited by examiner

ELECTRONIC CONTROL DEVICE AND VEHICLE CONTROL SYSTEM

TECHNICAL FIELD

The present disclosure relates to an electronic control device and a vehicle control system.

BACKGROUND ART

Conventionally, an invention related to a course setting device has been known (refer to PTL 1 below). This conventional course setting device is a device that sets a course on which a host vehicle travels, and includes an obstacle recognizing unit, a first route generating unit, a moving obstacle detecting unit, a second route generating unit, a third route generating unit, a reliability calculating unit, and a course setting unit (refer to PTL 1, abstract, etc.).

The obstacle recognizing unit recognizes an obstacle around the host vehicle. The first route generating unit generates a first route of the host vehicle assuming that all the obstacles are stationary obstacles. The moving obstacle detecting unit detects a moving obstacle from among the obstacles. The second route generating unit generates a second route of the host vehicle in a case where it is assumed that the moving obstacle moves independently.

The third route generating unit generates a third route of the host vehicle in a case where it is assumed that the moving obstacle moves while interacting with at least one of the other obstacle and the host vehicle. The reliability calculating unit calculates reliability of the second route and reliability of the third route. The course setting unit sets a course on which the host vehicle travels from among the first route, the second route, and the third route on the basis of the reliability of the second route and the reliability of the third route.

This conventional course setting device constitutes a part of an autonomous driving system. The autonomous driving system executes autonomous driving of a vehicle such as a passenger car. Autonomous driving is vehicle control in which a vehicle autonomously travels toward a preset destination (refer to PTL 1, paragraph 0020, paragraph 0021, and the like).

CITATION LIST

Patent Literature

PTL 1: JP 2018-176879 A

SUMMARY OF INVENTION

Technical Problem

As described above, the conventional course setting device recognizes an obstacle, generates first to third routes of the host vehicle, calculates reliabilities of the second and third routes, and sets a course on which the host vehicle travels from among the first to third routes on the basis of the reliabilities. Therefore, the conventional course setting device has problems of an increase in cost due to an increase in calculation amount and uncertainty of the course of the host vehicle set based on obstacles recognized in the past.

The present disclosure provides an electronic control device and a vehicle control system capable of reducing a calculation amount and improving reliability of a travel route of a vehicle as compared with the conventional course setting device.

Solution to Problem

One aspect of the present disclosure is an electronic control device mounted on a vehicle, the electronic control device including a map processing device connected to an external sensor that recognizes an obstacle around the vehicle and a position sensor that acquires position information of the vehicle in a manner capable of information communication, in which the map processing device includes a storage device that stores map information including travel route information of the vehicle, records a travel route along which the vehicle avoids the obstacle in the storage device, classifies the obstacle into a permanent obstacle and a transient obstacle, and updates the travel route information with an avoiding route based on the travel route along which the vehicle has avoided the permanent obstacle.

Advantageous Effects of Invention

According to the above one aspect of the present disclosure, it is possible to provide an electronic control device and a vehicle control system capable of reducing a calculation amount and improving reliability of a travel route of a vehicle as compared with the conventional course setting device.

DESCRIPTION OF EMBODIMENTS

Hereinafter, embodiments of an electronic control device and a vehicle control system according to the present disclosure will be described with reference to the drawings.

Figure 1:
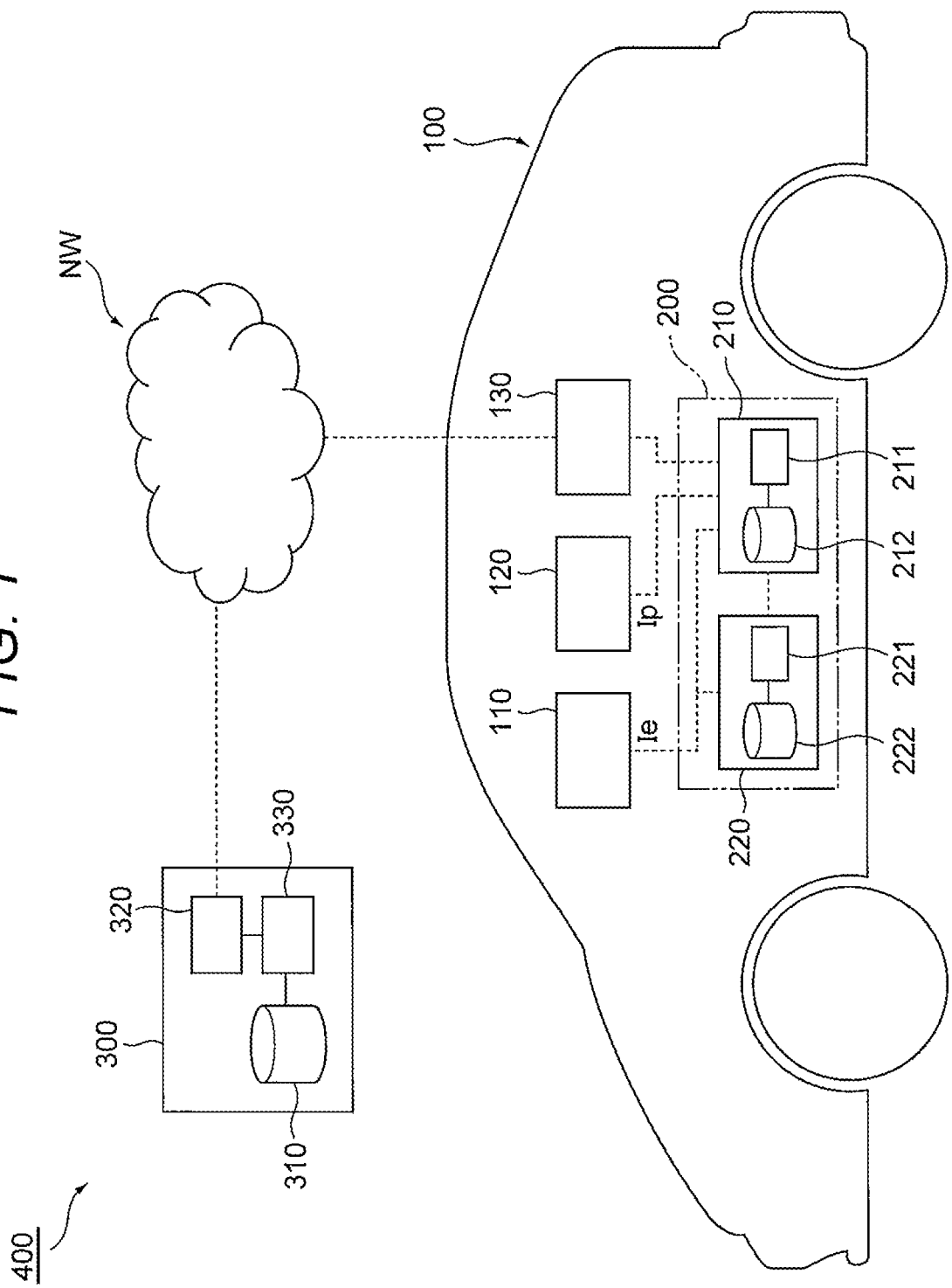
FIG. 1 is a schematic diagram illustrating an embodiment of an electronic control device and a vehicle control system according to the present disclosure.

FIG. 1 is a schematic diagram illustrating an embodiment of an electronic control device and a vehicle control system according to the present disclosure. An electronic control device 200 of the present embodiment is mounted on a vehicle 100 including an external sensor 110 and a position sensor 120. In addition, a vehicle control system 400 of the present embodiment includes the electronic control device 200 and a map information server 300 installed outside the vehicle 100 and connected to the electronic control device 200 in a manner capable of information communication.

The external sensor 110 mounted on the vehicle 100 includes, for example, an imaging device such as a stereo camera or a monocular camera, and recognizes an obstacle around the vehicle 100 and a road sign such as a white line. In addition, the external sensor 110 recognizes the type of an obstacle such as a pedestrian, an automobile, a motorcycle, a bicycle, a guardrail, a curbstone, a building, a road sign, a utility pole, or another feature by pattern matching, for example. The position sensor 120 mounted on the vehicle 100 includes, for example, a satellite positioning system such as a global navigation satellite system (GNSS), and acquires position information of the vehicle 100.

The vehicle 100 includes, for example, a vehicle sensor (not illustrated). The vehicle sensor includes, for example, a speed sensor that detects a speed of the vehicle, an acceleration sensor that detects an acceleration of the vehicle, a steering angle sensor that detects a steering angle of the vehicle, an accelerator sensor that detects an operation amount of an accelerator pedal, a brake sensor that detects a depression force of a brake pedal, and the like. The vehicle sensor may further include various sensors that detect other states of the vehicle, such as a shift sensor that detects a shift operation by the driver.

The vehicle 100 includes, for example, various actuators (not illustrated) such as an actuator that controls acceleration/deceleration of the vehicle 100, an actuator that controls a steering angle, and an actuator that controls a transmission. These various actuators are controlled by, for example, a travel control device 220 included in the electronic control device 200, and realize autonomous driving and driving support of the vehicle 100.

The vehicle 100 includes, for example, a communication device 130. The communication device 130 is connected to a map processing device 210 constituting the vehicle 100 via an in-vehicle network such as a controller area network (CAN) or in-vehicle Ethernet (registered trademark) in a manner capable of information communication. Furthermore, the communication device 130 mounted on the vehicle 100 is connected to the map information server 300 installed outside the vehicle 100 via a network NW such as a wireless LAN, a wired LAN, or the Internet in a manner capable of information communication.

The electronic control device 200 includes, for example, a microcontroller or firmware. More specifically, the microcontroller constituting the electronic control device 200 includes a central processing unit 211, 221, a storage device 212, 222 including a memory such as a RAM and a RON, programs and data stored in the storage device 212, 222, a timer (not illustrated), an input/output unit for communicating with an external device, and the like.

The electronic control device 200 includes the map processing device 210. The map processing device 210 includes, for example, the above-described microcontroller, and includes the central processing unit 211 and the storage device 212. The map processing device 210 is connected to the external sensor 110, the position sensor 120, and the communication device 130, for example, via the above-described in-vehicle network in a manner capable of information communication.

In addition, the electronic control device 200 includes, for example, the travel control device 220 that controls travel of the vehicle 100. The travel control device 220 includes, for example, the above-described microcontroller, and includes the central processing unit 221 and the storage device 222. The travel control device 220 is connected to the external sensor 110 and the map processing device 210 via, for example, the above-described in-vehicle network in a manner capable of information communication.

In addition, the electronic control device 200 is connected to the map information server 300 via, for example, the communication device 130 mounted on the vehicle 100 and the network NW in a manner capable of information communication. The map information server 300 is, for example, a computer connected to the network NW, and includes a server storage device 310, a communication device 320, and a server processing device 330.

The server storage device 310 includes, for example, a RAM, a ROM, a hard disk, a flash memory, and the like, and stores map information Im (see FIG. 3) including travel route information Irt of the vehicle 100. The communication device 320 is connected to a plurality of communication devices 130 of a plurality of vehicles 100 via the network NW such as a wireless LAN, a wired LAN, or the Internet in a manner capable of information communication. The server processing device 330 is, for example, a central processing unit, acquires map information Im updated by the map processing device 210 from the electronic control device 200 via the communication device 130, and updates the map information Im stored in the server storage device 310.

Figure 2:
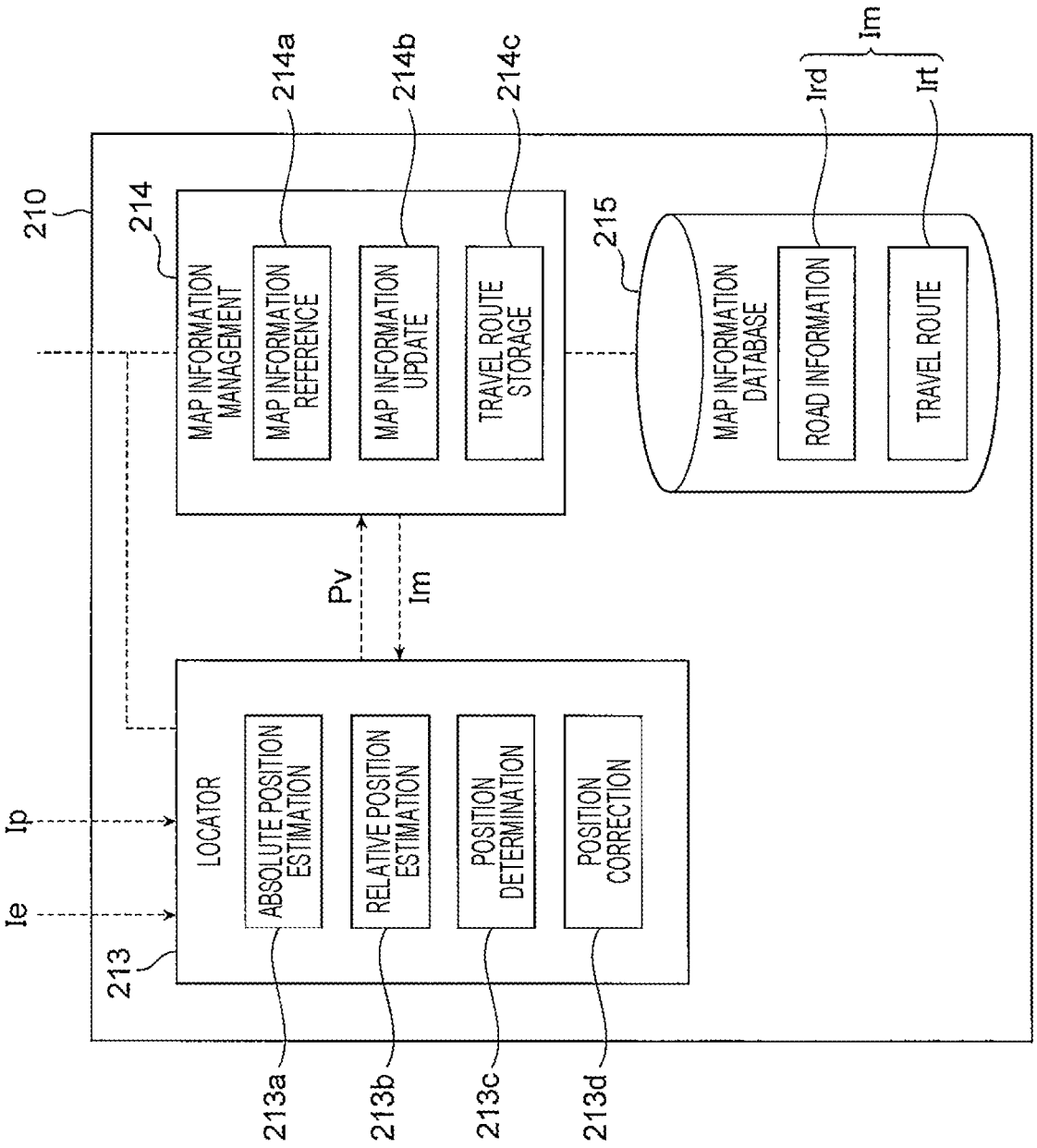
FIG. 2 is a functional block diagram of a map processing device included in the electronic control device illustrated in FIG. 1.

FIG. 2 is a functional block diagram of the map processing device 210 included in the electronic control device illustrated 200 illustrated in FIG. 1. The map processing device 210 has, for example, a locator function 213, a map information management function 214, and a map information database 215. Each function of the map processing device 210 can be implemented by executing a program stored in the storage device 212 by the central processing unit 211 and referring to information stored in the storage device 212.

For example, the locator function 213 inputs at least one of external information Ie around the vehicle 100 acquired from the external sensor 110, position information Ip of the vehicle 100 acquired from the position sensor 120, a detection result of the vehicle sensor, and map information Im acquired from the map information management function 214. Based on these inputs, the locator function 213 calculates a position PV of the vehicle 100 on the map constituting road information Ird included in the map information Im stored in the storage device 212. The locator function 213 outputs the calculated position Pv of the vehicle 100 to, for example, the map information management function 214.

More specifically, the locator function 213 includes, for example, an absolute position estimating function 213a, a relative position estimating function 213b, a position determination function 213c, and a position correction function 213d. For example, the absolute position estimating function 213a detects an absolute position of the vehicle 100 in a coordinate system of the earth center such as a WGS-84 coordinate system or an ITRF coordinate system on the basis of the position information Ip of the vehicle 100 acquired from the position sensor 120. The absolute position estimating function 213a may detect, for example, the absolute position of the vehicle 100 using vehicle information such as the acceleration of the vehicle 100 acquired from the vehicle sensor in addition to the position information Ip.

The relative position estimating function 213b detects, for example, a relative distance between the vehicle 100 and an object including an obstacle around the vehicle or a road sign on the basis of an output of a stereo camera included in the external sensor 110. The position determination function 213c determines the position of the vehicle 100 on the map constituting the road information Ird on the basis of, for example, the absolute position of the vehicle 100 detected by the absolute position estimating function 213a and the relative distance between the vehicle 100 and an object around the vehicle detected by the relative position estimating function 213b. For example, the position correction function 213d adjusts the position of the vehicle 100 on the map constituting the road information Ird.

The map information management function 214 updates, for example, the travel route information Irt included in the map information Im stored in the storage device 212. More specifically, the map information management function 214 includes, for example, a map information reference function 214a, a map information update function 214b, and a travel route storage function 214c. The map information reference function 214a refers to the map information Im stored in the storage device 212. The map information update function 214b updates the travel route information Irt included in the map information Im stored in the storage device 212. The travel route storage function 214c temporarily stores and holds a travel route along which the vehicle 100 has avoided an obstacle.

Map information Im is recorded in the map information database 215. The map information Im includes, for example, road information Ird and travel route information Irt. The road information Ird includes, for example, a road map, a road shape, lane information, road sign information, speed regulation information, traffic light information, feature information, obstacle information, traffic regulation information, and the like. The travel route information Irt includes, for example, a travel route recorded while the vehicle 100 is traveling, a recommended route based on the road information Ird, a virtual travel route to be described later, and the like.

Figure 3:
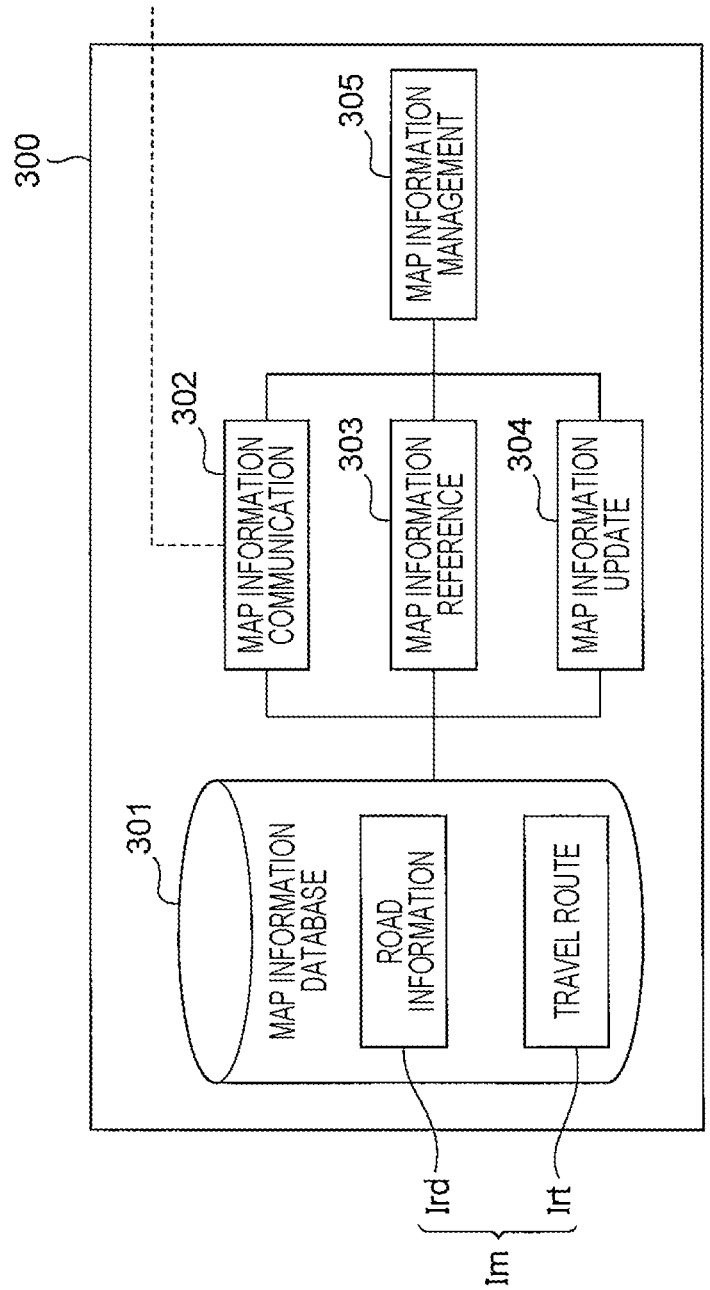
FIG. 3 is a functional block diagram of a map information server included in the vehicle control system illustrated in FIG. 1.

FIG. 3 is a functional block diagram of the map information server 300 included in the vehicle control system 400 illustrated in FIG. 1. The map information server 300 includes, for example, a map information database 301, a map information communication function 302, a map information reference function 303, a map information update function 304, and a map information management function 305. Each function of the map information server 300 can be implemented by executing a program stored in the server storage device 310 by the server processing device 330.

In the map information database 301, similarly to the map information database 215 of the electronic control device 200 mounted on the vehicle 100, map information Im including road information Ird and travel route information Irt is recorded. The map information communication function 302 performs information communication with the electronic control devices 200 of the plurality of vehicles 100 via the network NW and the communication devices 130 of the plurality of vehicles 100. The map information reference function 303 acquires the lane links included in the travel route information Irt from the map information database 301. Here, the lane link is a coordinate point sequence constituting the travel route of the vehicle 100.

The map information update function 304 records the travel route information Irt acquired from the electronic control device 200 of the vehicle 100 via the map information communication function 302 in the map information database 301, and updates the travel route information Irt recorded in the map information database 301 of the map information server 300. The map information management function 305 controls the operation of each of the map information communication function 302, the map information reference function 303, and the map information update function 304.

Figure 4:
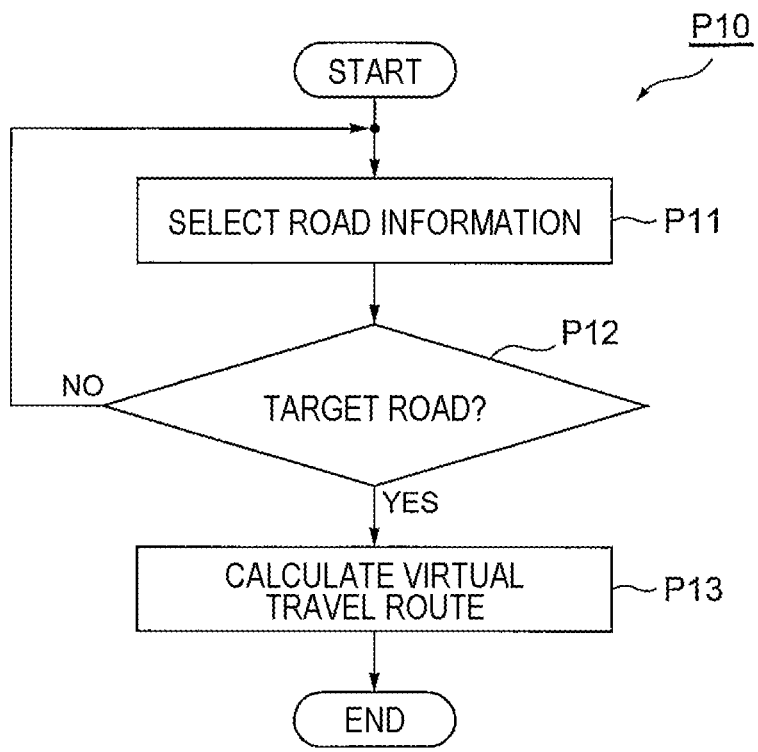
FIG. 4 is a flowchart illustrating processing by the map processing device or the map information server of FIG. 1.
Figure 5:
FIG. 5 is a plan view for explaining determination processing as to whether or not a road is a target road in FIG. 4.
Figure 5:
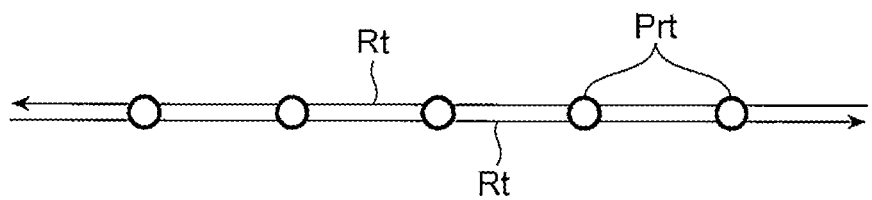
Figure 6:
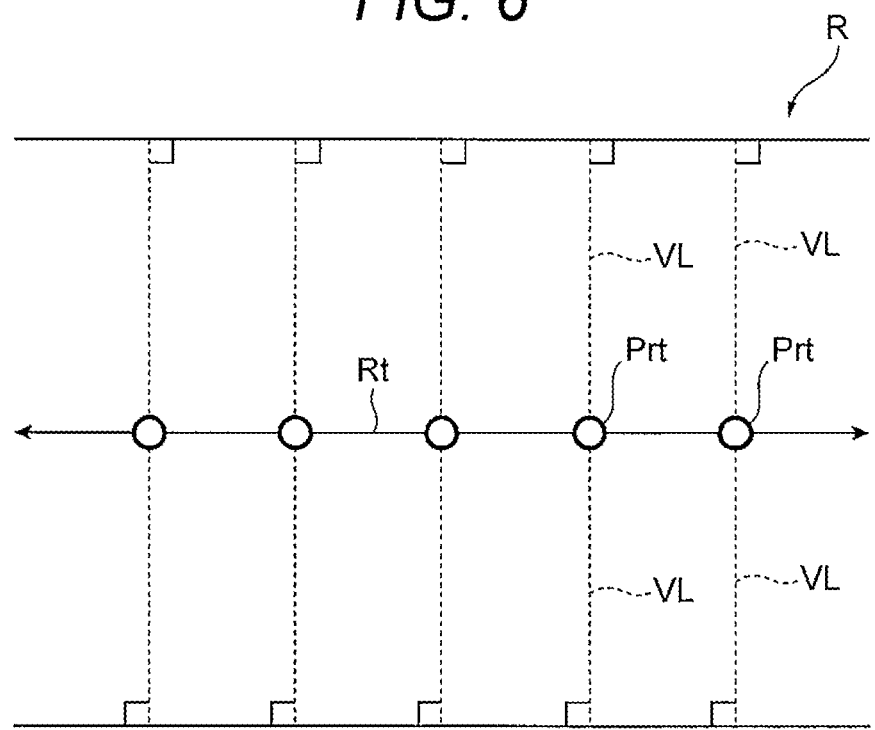
FIG. 6 is a plan view for explaining calculation processing of a virtual travel route in FIG. 4.
Figure 7:
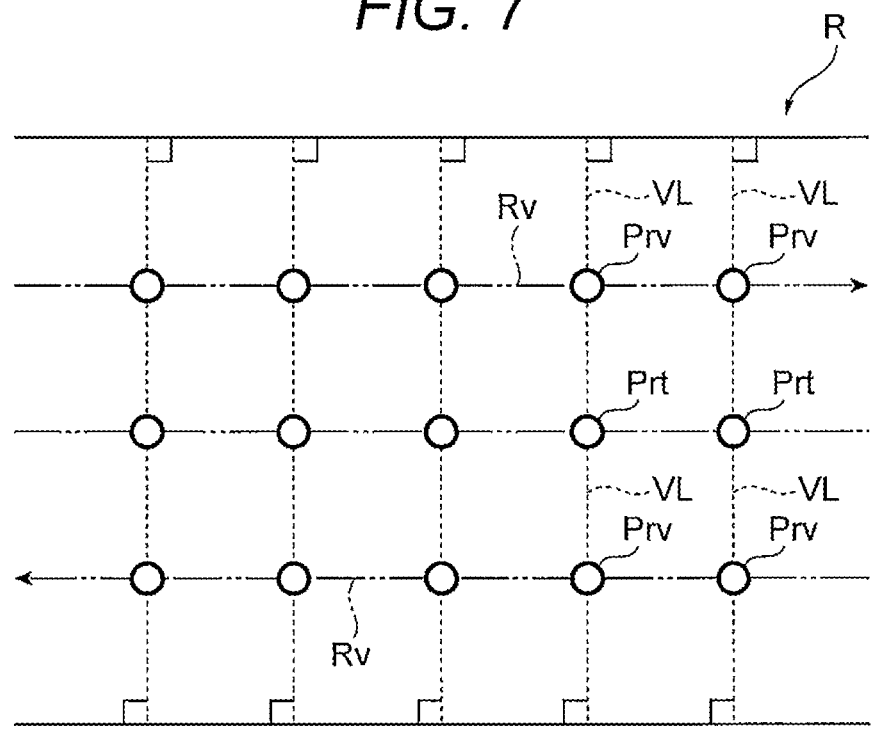
FIG. 7 is a plan view for explaining the calculation processing of the virtual travel route in FIG. 4.

Hereinafter, an example of operations of the electronic control device 200 and the vehicle control system 400 of the present embodiment will be described. FIG. 4 is a flowchart illustrating a virtual travel route calculation processing P10 by the map processing device 210 or the map information server 300 of FIG. 1. FIG. 5 is a plan view of a road R for explaining processing P11 of selecting road information illustrated in FIG. 4 and determination processing P12 as to whether or not the road is a target road. FIGS. 6 and 7 are plan views for explaining calculation processing P13 of the virtual travel route in FIG. 4.

The virtual travel route calculation processing P10 illustrated in FIG. 4 can be performed by either the map processing device 210 or the map information server 300. Hereinafter, an example in which the virtual travel route calculation processing P10 is performed by the map information server 300 will be described. For example, when the road information 3rd stored in the server storage device 310 is updated, the map information server 300 starts the virtual travel route calculation processing P10.

The map information server 300 first executes the processing P11 of selecting road information. In this processing P11, the map information server 300 controls the map information reference function 303 by the map information management function 305 to refer to the map information database 301, for example. Fox example, the map information reference function 303 selects one road R from a plurality of roads included in the road information Ird of the map information database 301. Further, the map information reference function 303 acquires a travel route Rt corresponding to the selected road R from among the plurality of travel routes included in the travel route information Irt of the map information database 301. The travel route Rt includes, for example, a lane link Prt which is a plurality of coordinate point sequences.

Next, the map information server 300 executes the processing P12 of determining whether or not the selected road R is a target road. In this processing P12, for example, the map information server 300 determines whether or not the selected road P is a two-way traffic road and has no center line on the basis of the travel route Rt of the selected road R by the map information management function 305.

When the travel route Rt of the selected road R is a one-way traffic road in one direction, the map information management function 305 determines that the selected road is not a target road (NO) in the processing P12, and returns to the processing P11 of selecting another road. Further, when the travel route Rt of the selected road R is a bidirectional two-way traffic road, the map information management function 305 further determines whether or not the travel routes Rt in the respective directions overlap in the processing P12. Whether or not the travel routes Rt in the respective directions overlap can be determined, for example, by whether or not the lane links Prt constituting the travel routes Rt in the respective directions overlap.

When the selected road R is a two-way traffic road but the travel routes Rt do not overlap, the map information management function 305 determines that the selected road R is not a target road (NO) in the processing P12, and returns to the processing P11 of selecting another road. On the other hand, when the selected road R is a two-way traffic road and the travel routes Rt overlap, the map information management function 305 determines in the processing P12 that the selected road R is a two-way traffic road having no center line, that is, a target road (YES), and executes the next processing P13.

In the calculation processing P13 of the virtual travel route, the map information management function 305 calculates a perpendicular line VL extending from each of the lane links Prt constituting the overlapping bidirectional travel routes Rt to the boundary lines at both ends in the width direction of the road R, for example, as illustrated in FIG. 6. Note that the boundary lines at both ends in the width direction of the road R are defined by, for example, an outer boundary line of the road R or a boundary between the road R and a road shoulder, and are included in the road information Ird. Further, as illustrated in FIG. 7, for example, the map information management function 305 sets a virtual lane link Prv constituting a virtual travel route Rv at the midpoint of the perpendicular line VL.

As described above, when the road R is a target road, that is, when the road R is a two-way traffic road having no center line, the map information management function 305 calculates virtual travel routes Rv in opposite directions formed by the virtual lane links Prv on the left and right sides in the width direction of the road R. Further, the map information management function 305 stores the calculated virtual travel routes Rv in the map information database 301 as the travel route information Irt by the map information update function 304 in the calculation processing P13 of the virtual travel route, and updates the map information Im. Thus, each processing illustrated in FIG. 4 ends.

As described above, the map information server 300 can execute each processing illustrated in FIG. 4 by each function illustrated in FIG. 3 by executing the programs stored in the server storage device 310 by the server storage device 310. That is, the server storage device 310 can extract, as a target road, a two-way traffic road having no center line, from the road information Ird included in the map information Im stored in the server storage device 310. Furthermore, the server storage device 310 can calculate virtual travel routes Rv in opposite directions to each other on the right side and the left side of the extracted target road, and store the virtual travel routes Rv in the server storage device 310 as the travel route information Irt.

The virtual travel routes Rv stored in the server storage device 310 of the map information server 300 are distributed to the communication devices 130 of the plurality of vehicles 100 via the communication device 320 and the network NW, for example. The virtual travel routes Rv distributed to the communication device 130 of each vehicle 100 are stored in, for example, the storage device 212 of the map processing device 210 constituting the electronic control device 200, and the travel route information Irt of the map information Im is updated. The travel control device 220 constituting the electronic control device 200 can acquire the travel route information Irt from the map processing device 210 and cause the vehicle 100 to autonomously travel, for example.

In addition, each processing illustrated in FIG. 4 can also be executed by the electronic control device 200 as described above. In this case, by executing the program stored in the storage device 212 of the map processing device 210 by the central processing unit 211, it is possible to execute each processing illustrated in FIG. 4 by each function illustrated in FIG. 2. That is, the map processing device 210 can extract, from the road information Ird included in the map information Im, a two-way traffic road having no center line as a target road. Further, the map processing device 210 can calculate virtual travel routes Rv in opposite directions to each other on the right side and the left side of the extracted target road, and store the virtual travel routes Rv in the storage device 212 as the travel route information Irt.

Figure 8:
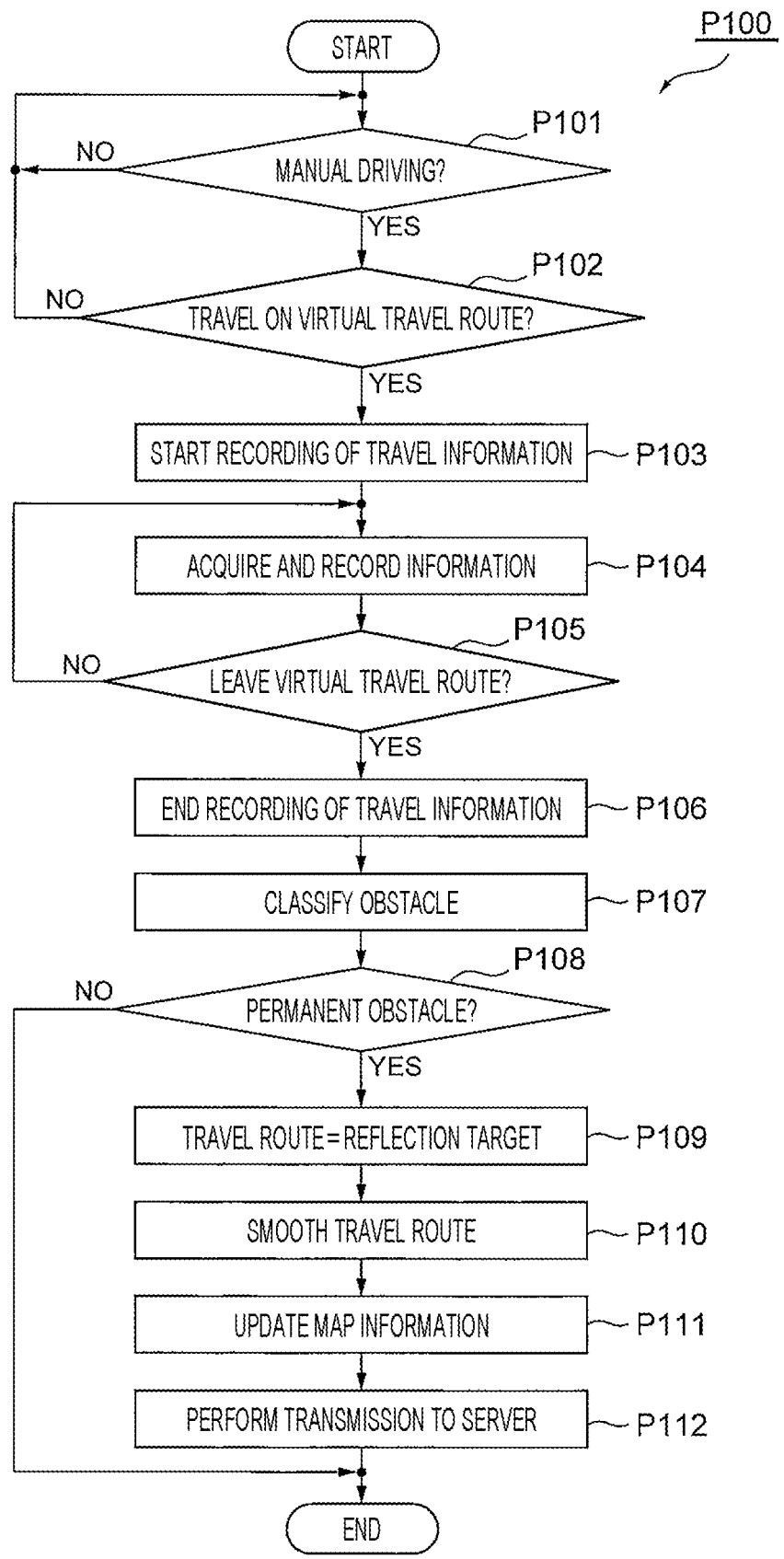
FIG. 8 is a flowchart illustrating processing by the map processing device of FIG. 2.
Figure 9:
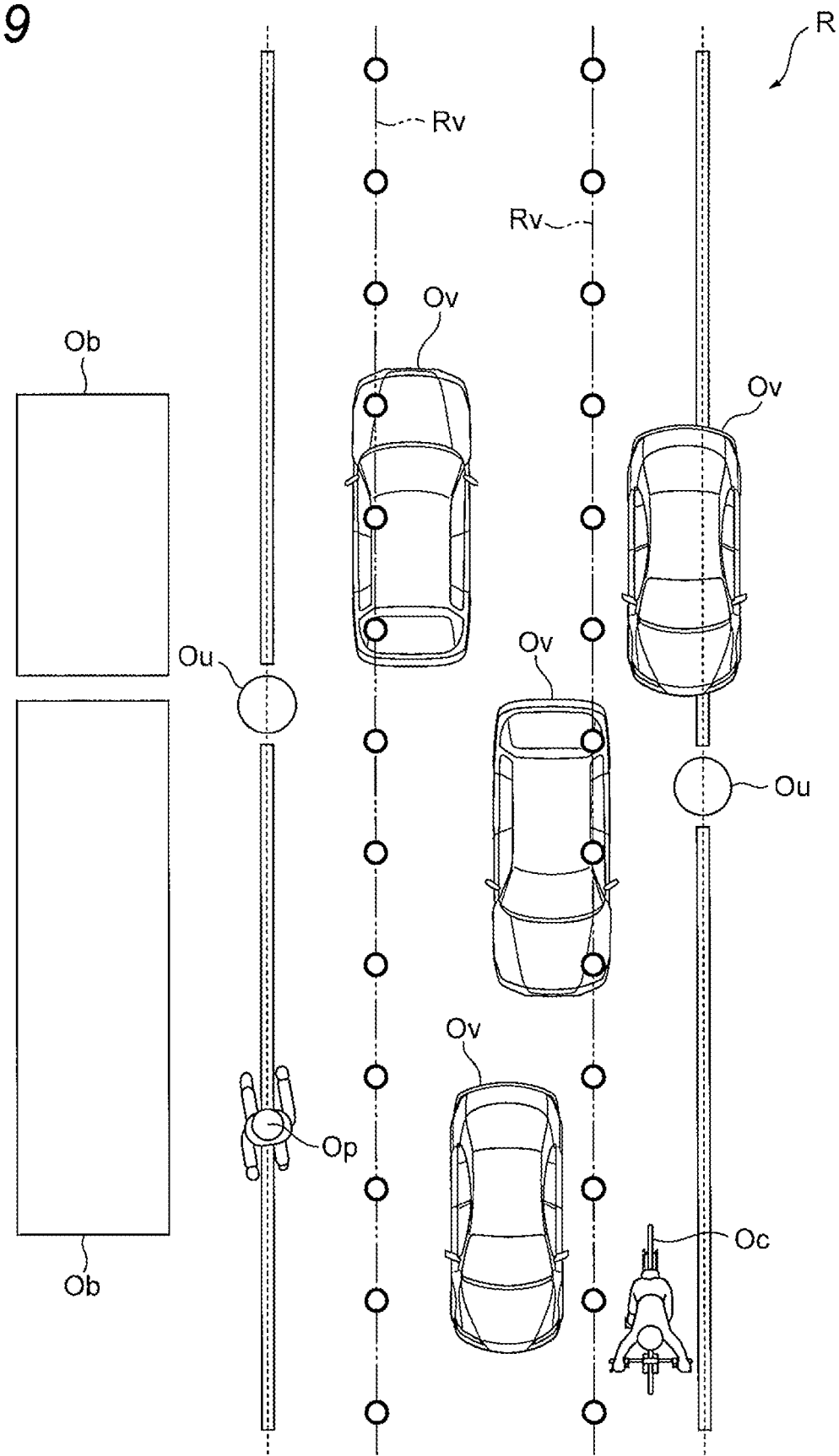
FIG. 9 is a plan view for explaining determination processing as to whether or not a vehicle is traveling on the virtual travel route of FIG. 8.

FIG. 8 is a flowchart illustrating update processing P100 of travel route information by the map processing device 210 of FIG. 2. FIG. 9 is a plan view of a road R for explaining determination processing P102 as to whether or not the vehicle is traveling on the virtual travel route of FIG. 8.

When starting the update processing P100 of the travel route information illustrated in FIG. 8, the map processing device 210 first executes determination processing P101 as to whether or not the vehicle 100 is in manual driving. In the determination processing P101, the map processing device 210 determines whether or not the vehicle 100 is in manual driving by, for example, the central processing unit 211 executing a program stored in the storage device 212.

More specifically, in the determination processing P101, the map processing device 210 determines whether or not the vehicle 100 is in manual driving by the central processing unit 211 on the basis of, for example, the operating state of the travel control device 220. In addition, the map processing device 210 may determine whether or not the vehicle 100 is in manual driving by the central processing unit 211 on the basis of detection results of a steering sensor, an accelerator sensor, a brake sensor, a shift sensor, and the like included in the vehicle sensor, for example.

In the determination processing P101, when the central processing unit 211 determines that the vehicle 100 is not in manual driving (NO), that is, during autonomous driving, the map processing device 210 repeatedly executes the processing P101. On the other hand, when the central processing unit 211 determines in the determination processing P101 that the vehicle 100 is in manual driving (YES), that is, not during autonomous driving, the map processing device 210 executes the next determination processing P102.

That is, the map processing device 210 executes the determination processing P102 for determining whether or not the vehicle 100 is traveling on the virtual travel route Rv. More specifically, the map processing device 210 calculates the position Pv of the vehicle 100 on the map constituting the road information Ird included in the map information Im by the locator function 213. Further, the map processing device 210 determines whether or not the virtual travel route Rv is calculated for the road on which the vehicle 100 is traveling or the road into which the vehicle 100 is about to enter by referring to the travel route information Irt by the map information reference function 214a.

When the virtual travel route Rv has not been calculated for the road on which the vehicle 100 is traveling or the road into which the vehicle 100 is about to enter, the map processing device 210 determines that the vehicle 100 does not travel on the virtual travel route (NO) by the central processing unit 211 in the determination processing P102. In this case, the map processing device 210 executes the determination processing P101 again.

On the other hand, as illustrated in FIG. 9, there is a case where the virtual travel route Rv is calculated for the road P on which the vehicle 100 is traveling or the road a into which the vehicle 100 is about to enter. In this case, the map processing device 210 determines that the vehicle 100 travels on the virtual travel route (YES) by the central processing unit 211 in the determination processing P102, and executes the next processing P103.

That is, the map processing device 210 executes the processing P103 for starting recording of travel information of the vehicle 100. More specifically, for example, the map processing device 210 calculates the position Pv of the vehicle 100 by the locator function 213, and records the travel route of the vehicle 100 by the travel route storage function 214c of the map information management function 214. In addition, the map processing device 210 may record the travel route on the basis of a detection result of the vehicle sensor such as the acceleration sensor mounted on the vehicle 100.

Further, the map processing device 210 executes processing P104 of acquiring and recording information on an obstacle. More specifically, for example, the map processing device 210 acquires information on an obstacle recognized by the imaging device such as the stereo camera or the monocular camera included in the external sensor 110 by the central processing unit 211, and records the information in the storage device 212. Here, the information on the obstacle recorded in the storage device 212 includes, for example, the type of the obstacle and the position information of the obstacle. For example, as illustrated in FIG. 9, the type of the obstacle includes a pedestrian Op, an automobile Ov, a bicycle Oc, a building Ob, a utility pole Ou, and the like.

Next, the map processing device 210 executes determination processing P105 as to whether or not the vehicle 100 has left the virtual travel route Rv. More specifically, the map processing device 210 compares, for example, the position Pv of the vehicle 100 calculated by the locator function 213 with the virtual travel route Rv included in the travel route information Irt referred to by the map information reference function 214a of the map information management function 214.

As a result, when determining that the vehicle 100 has not left the virtual travel route Rv (NO) by the central processing unit 211 in the determination processing P105, the map processing device 210 repeats the processing P104 and the determination processing P105. On the other hand, when determining that the vehicle 100 has left the virtual travel route Rv (YES) by the central processing unit 211 in the determination processing P105, the map processing device 210 executes processing P106 for ending the recording of the travel information.

Figure 10:
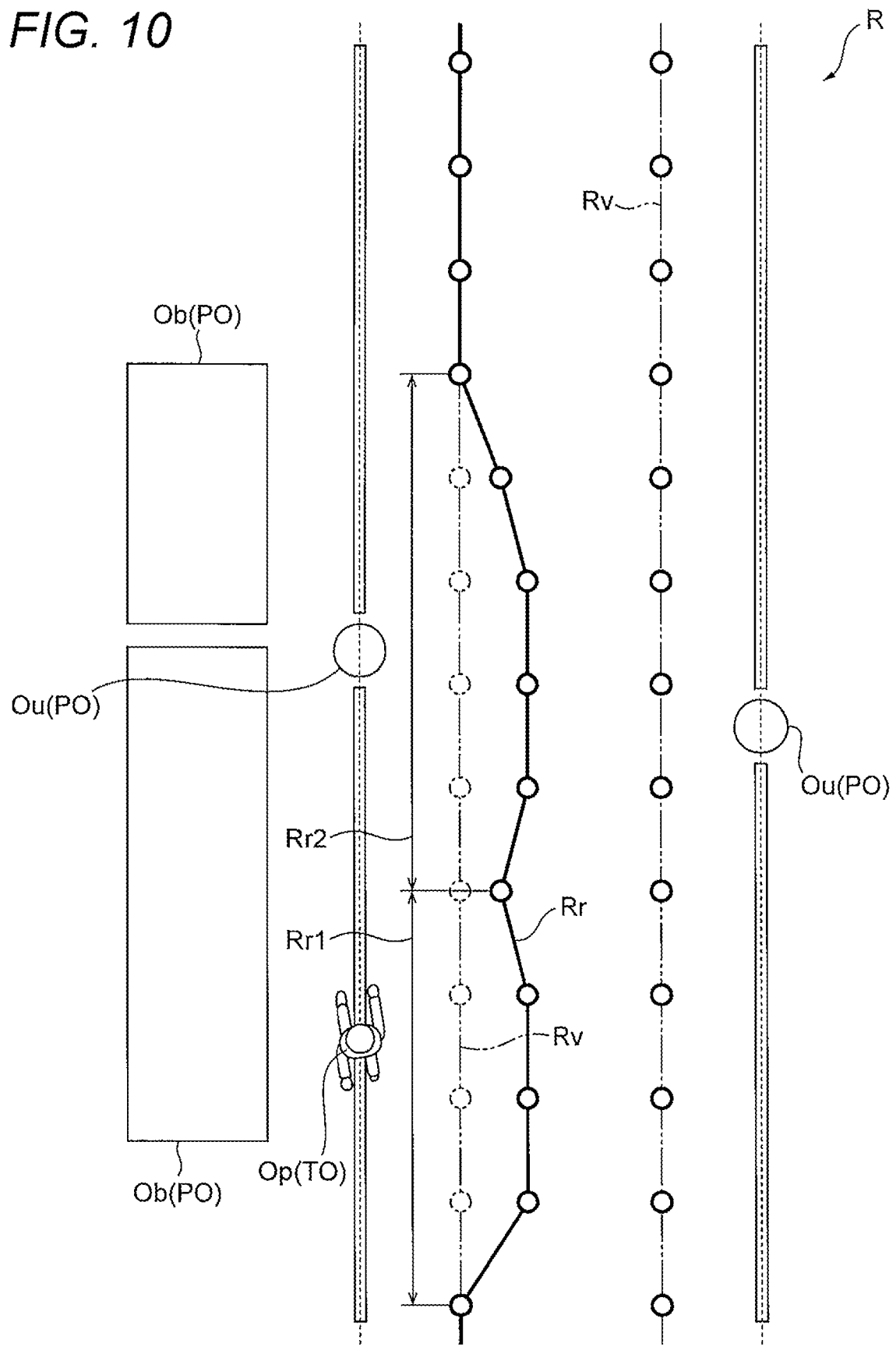
FIG. 10 is a plan view illustrating a travel route along which a vehicle traveling on the target road in FIG. 9 has avoided an obstacle.

FIG. 10 is a plan view illustrating an example of a travel route Rr of the vehicle 100 recorded by the map processing device 210 between the processing P103 for starting recording of travel information illustrated in FIG. 8 and the processing P106 for ending recording of travel information. In the example illustrated in FIG. 10, the travel route Rr of the vehicle 100 is a route that deviates from the virtual travel route Rv and avoids the pedestrian Op and the utility pole Ou.

Next, the map processing device 210 executes processing P107 of classifying the obstacle recognized by the external sensor 110 and stored in the storage device 212 into a permanent obstacle PO and a transient obstacle TO. More specifically, the map processing device 210 classifies the information on the obstacle stored in the storage device 212 into the permanent obstacle PO and the transient obstacle TO by the central processing unit 211 with reference to the control data stored in the storage device 212. Further, the map processing device 210 causes the travel route storage function 214c to store information on the obstacles classified into the permanent obstacle PO and the transient obstacle TO in the storage device 212.

The permanent obstacle PO is, for example, a static obstacle that does not move, and includes a guard rail, a curb, a building Ob, a road sign, a utility pole Ou, another feature, and the like. The transient obstacle TO is, for example, a dynamic obstacle that moves, and includes a pedestrian Op, an automobile Ov, a motorcycle, a bicycle Oc, and the like. For example, even a static obstacle that does not move, such as a parked vehicle or a construction site, which is likely to move or be eliminated in a relatively short period of about several minutes to several days, can be included in the transient obstacle TO.

Next, the map processing device 210 executes determination processing P108 as to whether or not the avoided obstacle is the permanent obstacle PO in portions Rr1 and Rr2 deviating from the virtual travel route Rv and avoiding the obstacle in the travel route Rr of the vehicle 100. In the example illustrated in FIG. 10, the pedestrian Op included in the transient obstacle TO is avoided in the first portion Rr1 of the travel route Rr of the vehicle 100. Therefore, in the determination processing P108, for the first portion Rr1 of the travel route Rr, the central processing unit 211 of the map processing device 210 determines that the avoided obstacle is not the permanent obstacle PO (NO), and the processing P100 illustrated in FIG. 8 ends.

On the other hand, in the example illustrated in FIG. 10, the utility pole Ou included in the permanent obstacle PO is avoided in the second portion Rr2 of the travel route Rr of the vehicle 100. Therefore, for the second portion Rr2 of the travel route Rr, the map processing device 210 determines that the avoided obstacle is the permanent obstacle PO (YES) by the central processing unit 211 in the determination processing P108, and executes the next processing P109.

That is, the map processing device 210 executes the processing P109 of setting the second portion Rr2 of the travel route Rr on which the vehicle 100 has avoided the permanent obstacle PO as the reflection target to the map information Im. More specifically, in this processing P109, the map processing device 210 causes the central processing unit 211 to add a flag indicating that the data is the reflection target to the data of the second portion Rr2 of the travel route Rr and store the data in the storage device 212, for example.

Figure 11:
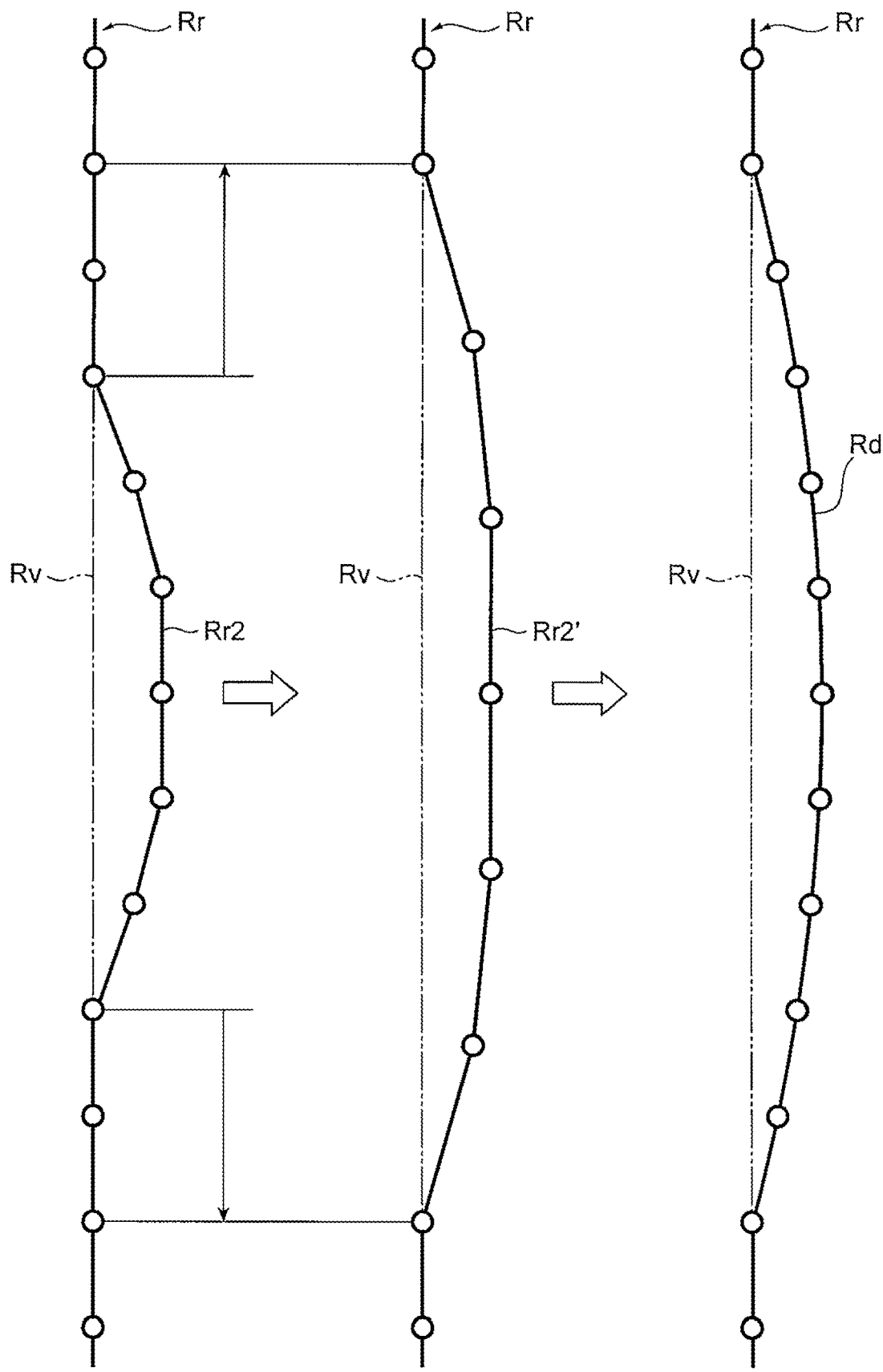
FIG. 11 is a plan view for explaining an example of smoothing processing for the travel route in FIG. 8.

Next, the map processing device 210 executes smoothing processing P110 for the second portion Rr2 of the travel route Rr avoiding the permanent obstacle PO. FIG. 11 is a plan view for explaining the smoothing processing P110 for the travel route Rr.

In this processing P110, the map processing device 210 executes the program stored in the storage device 212 by the central processing unit 211 to generate an extension route Rr2' based on the travel route Rr on which the vehicle 100 has avoided the permanent obstacle PO. More specifically, in this processing P110, the map processing device 210 moves the start point and the end point of the second portion Rr2 of the travel route Rr avoiding the permanent obstacle PO backward and forward of the travel route Rr, respectively, and extends the second portion Rr2 to generate an extension route Rr2'.

Furthermore, in this processing P110, the map processing device 210 executes a program stored in the storage device 212 by the central processing unit 211 to smooth the extension route Rr2'. More specifically, in this processing P110, the map processing device 210 generates an avoiding route Rd based on the travel route Rr on which the vehicle 100 has avoided the permanent obstacle PO by smoothing the extension route Rr2' using, tor example, a clothoid curve.

Next, the map processing device 210 executes update processing Pill of map information. More specifically, for example, the map processing device 210 stores the avoiding route Rd generated in the previous processing P110 in the map information database 215 by the map information update function 214b, and updates the travel route information Irt of the map information Im stored in the storage device 212.

Figure 12:
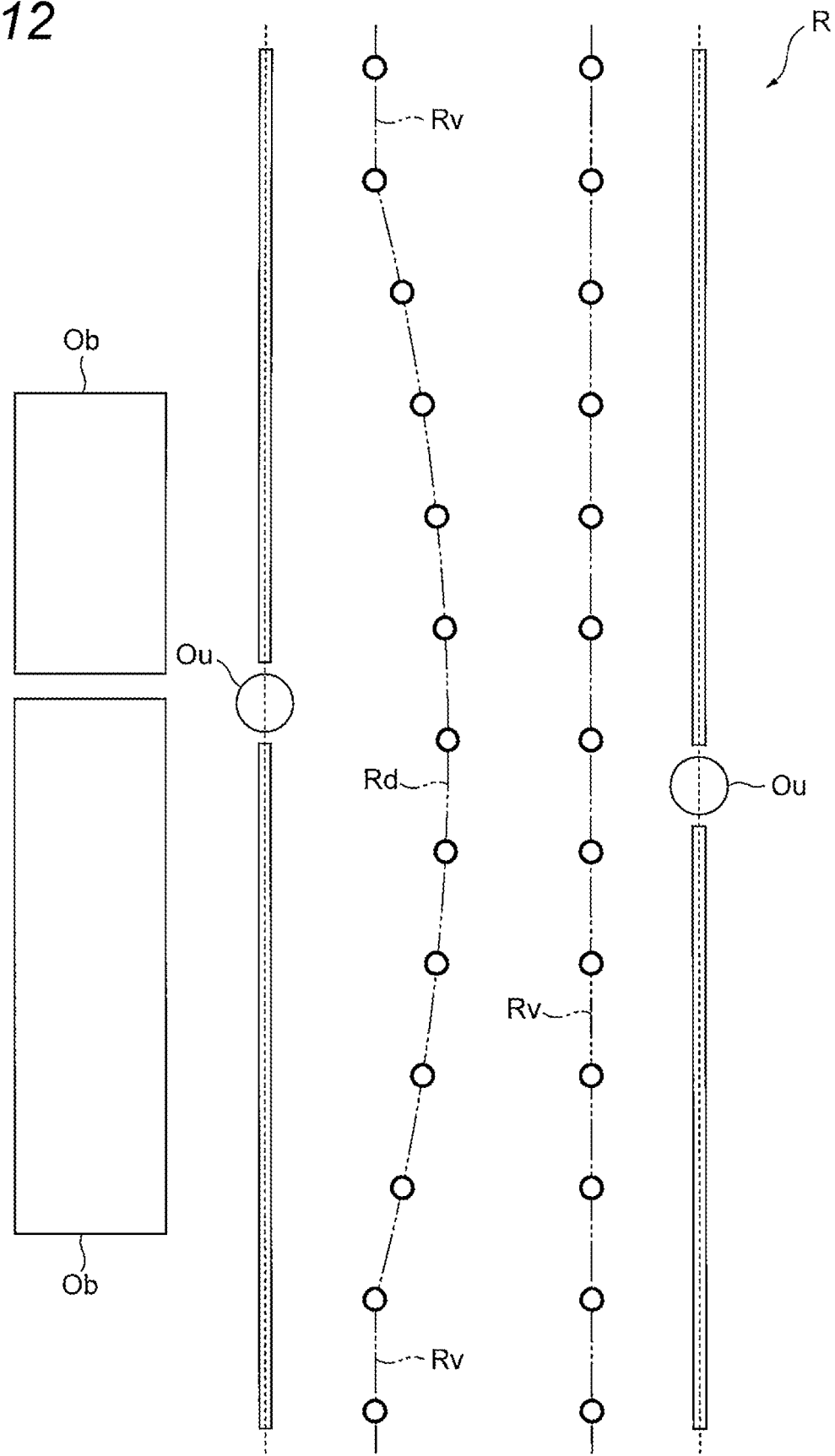
FIG. 12 is a plan view illustrating an example of travel route information updated in update processing of map information of FIG. 8.

FIG. 12 is a plan view illustrating an example of the travel route information Irt updated in the update processing P111 of the map information. In the example illustrated in FIG. 12, the virtual travel route Rv that is the travel route information Irt of the road R targeted for the processing Pill is partially updated by the avoiding route Rd that avoids the utility pole Ou that is the permanent obstacle PO.

Next, the map processing device 210 executes processing P112 of transmitting the updated travel route information Irt by the central processing unit 211 to the communication device 320 of the map information server 300 via the communication device 130 and the network NW. In this processing P112, the map information server 300 receives the travel route information Irt updated by the electronic control device 200 through the communication device 320.

Further, in this processing P112, the map information server 300 stores the travel route information Irt received from the electronic control device 200 in the server storage device 310 by the map information update function 304, and updates the travel route information Irt of the map information database 301. Thus, the processing P100 illustrated in FIG. 8 ends.

As described above, the electronic control device 200 of the present embodiment includes the map processing device 210 that is mounted on the vehicle 100 and is connected to the external sensor 110 that recognizes an obstacle around the vehicle 100 and the position sensor 120 that acquires position information of the vehicle 100 in a manner capable of information communication. The map processing device 210 includes the storage device 212 that stores map information Im including travel route information Irt of the vehicle 100. The map processing device 210 records the travel route Rr along which the vehicle 100 avoids an obstacle in the storage device 212, and classifies the obstacle into a permanent obstacle PO and a transient obstacle TO. Further, the map processing device 210 updates the travel route information Irt with the avoiding route Rd based on the travel route Rr on which the vehicle 100 has avoided the permanent obstacle PO.

With such a configuration, the electronic control device 200 of the present embodiment can record and hold in advance the avoiding route Rd based on the travel route Rr on which the vehicle 100 has actually avoided the permanent obstacle PO in the storage device 212 as the travel route information Irt. As a result, while the vehicle 100 autonomously travels, the vehicle 100 can travel along the avoiding route Rd included in the travel route information Irt recorded in the storage device 212, and avoid the permanent obstacle PO. Therefore, according to the electronic control device 200 of the present embodiment, the calculation amount of the electronic control device 200 can be reduced, and the reliability of the travel route Rr of the vehicle 100 can be improved as compared with the conventional course setting device.

In addition, the vehicle control system 400 of the present embodiment includes the electronic control device 200 described above, and the map information server 300 installed outside the vehicle 100 and connected to the electronic control device 200 in a manner capable of information communication. The map information server 300 includes the server storage device 310 that stores map information Im including travel route information Irt of the vehicle 100, the communication device 320 that communicates with the electronic control device 200, and the server processing device 330 that acquires the travel route information Irt updated from the electronic control device 200 via the communication device 320 and updates the travel route information Irt stored in the server storage device 310.

With such a configuration, the vehicle control system 400 of the present embodiment can record and hold the avoiding route Rd based on the travel route Rr on which the plurality of vehicles 100 have actually avoided the permanent obstacle PO in the server storage device 310 in advance as the travel route information Irt.

As a result, the map information server 300 can distribute the updated travel route information Irt including the avoiding route Rd of the permanent obstacle PO to the electronic control devices 200 of the plurality of vehicles 100 by the communication device 320. As a result, each vehicle 100 can cause the vehicle 100 to travel along the avoiding route Rd included in the travel route information Irt recorded in the storage device 212 during autonomous traveling, and can avoid the permanent obstacle PO.

Therefore, according to the vehicle control system 400 of the present embodiment, the calculation amount of the electronic control device 200 can be reduced, and the reliability of the travel route Rr of the vehicle 100 can be improved as compared with the conventional course setting device. That is, according to the present embodiment, it is possible to provide the electronic control device 200 and the vehicle control system 400 capable of reducing the calculation amount and improving the reliability of the travel route Rr of the vehicle 100 as compared with the conventional course setting device.

In addition, in the vehicle control system 400 of the present embodiment, the server processing device 330 extracts, as a target road, a two-way traffic road having no center line from the road information Ird included in the map information Im stared in the server storage device 310. Further, the server processing device 330 calculates virtual travel routes Rv in opposite directions to each other on the right side and the left side of the road R which is the extracted target road, and stores the virtual travel routes Rv in the server storage device 310 as the travel route information Irt.

With such a configuration, according to the vehicle control system 400 of the present embodiment, it is possible to generate the travel route information Irt constituting the map information Im on the basis of the travel route Rr on which the vehicle 100 has actually traveled on a two-way traffic road having no center line. As a result, it is possible to generate the travel route information Irt including the avoiding route Rd conforming to the situation of the permanent obstacle PO of the road R and the specification of each vehicle 100 on the two-way traffic road having no center line. Therefore, it is possible to suppress the processing cost by reducing the calculation amount at the time of autonomous traveling of the vehicle 100, and to realize stable autonomous driving with high reliability.

Note that, in the electronic control device 200 according to the present embodiment, the map processing device 210 may extract, as the target road, a two-way traffic road having no center line, from the road information Ird included in the map information Im. In this case, the map processing device 210 can calculate virtual travel routes Rv in opposite directions to each other on the left side and the right side of the road R which is the extracted target road, and store the virtual travel routes Rv in the storage device 212 as the travel route information Irt.

The electronic control device 200 having such a configuration can also generate the travel route information Irt constituting the map information Im on the basis of the travel route Rr on which the vehicle 100 has actually traveled on a two-way traffic road having no center line. As a result, it is possible to generate the travel route information Irt including the avoiding route Rd conforming to the situation of the permanent obstacle PO of the road R and the specification of each vehicle 100 on the two-way traffic road having no center line. Therefore, it is possible to suppress the processing cost by reducing the calculation amount at the time of autonomous traveling of the vehicle 100, and to realize stable autonomous driving with high reliability.

In addition, in the electronic control device 200 of the present embodiment, the map processing device 210 records the travel route Rr only when the vehicle 100 is in manual driving and the vehicle 100 is traveling on a target road that is a two-way traffic road having no center line. In addition, after the vehicle 100 leaves the target road, the map processing device 210 performs classification of obstacles recognized by the external sensors 110 and update of the travel route information Irt.

With such a configuration, according to the electronic control device 200 of the present embodiment, it is possible to limit the conditions for recording the travel route Rr and to further reduce the calculation amount. In addition, there is a case where travel route information Irt in the opposite directions overlap with each other at the center of a road of a two-way traffic road having no center line, and when virtual travel routes Rv in opposite directions are generated on the left side and the right side of such a road R having a relatively narrow road width, avoidance of the permanent obstacle PO becomes a problem. For this reason, by using the two-way traffic road having no center line as the target road for generating the avoiding route Rd, the travel route information Irt can be more efficiently updated, and stable autonomous driving with high reliability can be realized.

In addition, in the electronic control device 200 of the present embodiment, the map processing device 210 generates the avoiding route Rd by smoothing the travel route Rr on which the vehicle 100 has avoided the permanent obstacle PO.

With such a configuration, according to the electronic control device 200 of the present embodiment, the avoiding route Rd can be made smoother than the travel route Rr on which the vehicle 100 during manual driving has actually avoided the permanent obstacle PO. Therefore, in the autonomous driving in which the vehicle 100 travels in accordance with the updated travel route information Irt including the avoiding route Rd, stable autonomous driving with high reliability can be realized.

In addition, in the vehicle control system 400 of the present embodiment, the map processing device 210 of the electronic control device 200 acquires the map information Im including the virtual travel route Rv from the map information server 300 and stores the map information Im in the storage device 212 as the map information Im.

With such a configuration, according to the vehicle control system 400 of the present embodiment, the map information Im stored in the storage devices 212 of the plurality of vehicles 100 can be updated as needed. More specifically, for example, travel route information Irt including an avoiding route Rd generated when one vehicle 100 has traveled along the virtual travel route Rv on a two-way traffic road having no center line can be transmitted to the map information server 300 and recorded in the server storage device 310.

Further, the travel route information Irt including the avoiding route Rd recorded in the server storage device 310 of the map information server 300 can be transmitted to the plurality of vehicles 100 to be shared.

As described above, according to the present embodiment, it is possible to provide the electronic control device 200 and the vehicle control system 400 capable of reducing the calculation amount and improving the reliability of the travel route Rr of the vehicle 100 as compared with the conventional course setting device.

Note that, in the example illustrated in FIG. 10, since the boundaries on both sides in the width direction of the road R are defined by roadway outer lines, the vehicle 100 can travel on the boundary of the road R. However, when the boundary of the road R is defined by a fence or a wall of a building, the fence or the wall that is the boundary of the road R is determined as the permanent obstacle PO. In this case, the vehicle 100 takes a certain distance to the center of the road R with respect to the boundary of the road R, and travels on the travel route Rr deviated from the virtual travel route Rv. The travel route Rr is also determined as the travel route Rr avoiding the permanent obstacle PO by the central processing unit 211 of the map processing device 210, and the travel route information Irt of the map information database 215 is updated by the map information management function 214.

Although the embodiments of the electronic control device and the vehicle control system according to the present disclosure have been described in detail with reference to the drawings, the specific configuration is not limited to this embodiment, and design changes and the like without departing from the gist of the present disclosure are included in the present disclosure.

For example, in the above-described embodiment, an example has been described in which virtual travel routes in opposite directions to each other on the right side and the left side are calculated with respect to a two-way traffic road having no center line, and a travel route in which the vehicle avoids an obstacle only when the vehicle travels on the virtual travel routes is recorded. However, the electronic control device and the vehicle control system according to the present disclosure are not limited to the above-described embodiments. That is, the electronic control device and the vehicle control system may record a travel route in which the vehicle avoids the obstacle also when the vehicle travels on a normal travel route other than the virtual travel route, and update the travel route information with an avoiding route based on the travel route along which the vehicle has avoided the permanent obstacle.

In addition, in the above-described embodiment, an example has been described in which the travel route on which the vehicle avoids the obstacle only when the vehicle is in manual driving is recorded. However, the electronic control device and the vehicle control system according to the present disclosure are not limited to the above-described embodiments. That is, even during autonomous driving, the electronic control device and the vehicle control system may record a travel route on which the vehicle avoid, the obstacle, classify the obstacle into a permanent obstacle and a transient obstacle, and update the travel route information with an avoiding route based on the travel route along which the vehicle has avoided the permanent obstacle.

REFERENCE SIGNS LIST

- 100 vehicle
- 110 external sensor
- 120 position sensor
- 200 electronic control device
- 210 map processing device
- 212 storage device
- 300 map information server
- 310 server storage device
- 320 communication device
- 330 serves processing device
- 400 vehicle control system
- Im map information
- Ird road information
- Irt travel route information
- Ob building (obstacle)
- Oc bicycle (obstacle)
- Op pedestrian (obstacle)
- Ou utility pole (obstacle)
- Ov automobile (obstacle)
- PO permanent obstacle
- R road (target road)
- Rd avoiding route
- Rr travel route
- Rv virtual travel route
- TO transient obstacle

The invention claimed is:

1. An electronic control device mounted on a vehicle, the electronic control device comprising:
 a map processing device;
 an external sensor, coupled to the map processing device, the external sensor configured to recognize an obstacle around the vehicle; and
 a position sensor, coupled to the map processing device, the position sensor configured to acquire position information of the vehicle in a manner capable of information communication, wherein
 the map processing device comprises:
  a storage device, the storage device configured to store map information including travel route information of the vehicle; and
  a central processor, the central processor configured to:
   select a road from a plurality of roads stored in the storage device;
   acquire a travel route from the travel route information based on the selected road, the travel route comprising at least one lane link comprising a plurality of coordinate point sequences;
   determine that the travel route is a target road by determining that the travel route is along a bidirectional road and that the travel route in a first direction and a second direction overlap;
   determine perpendicular lines extending from each lane link of overlapping travel routes in the first direction and the second direction to boundary lines at both ends in a width direction of a road, responsive to determining that the travel route is the target road;
   set virtual lane links at midpoints of the perpendicular lines;
   calculate, based on the map information including travel route information, a virtual travel route formed by the virtual lane links;
   determine, based on the position information, that the vehicle is traveling on the virtual travel route, responsive to determining that the vehicle is in manual driving;
   record, based on the position information received from the position sensor, travel information of the vehicle, responsive to determining that the vehicle is traveling on the virtual travel route;
   identify, based on information received from the external sensor, the obstacle around the vehicle;
   determine that the vehicle has deviated from the virtual travel route by comparing the position information of the vehicle with the virtual travel route;
   classify the obstacle into a permanent obstacle or a transient obstacle;
   record a travel route along which the vehicle avoids the permanent obstacle in the storage device;
   update the travel route information and the virtual travel route with an avoiding route based on the travel route along which the vehicle has avoided the permanent obstacle;
   generate a travel route including the avoiding route, responsive to determining that the vehicle is in autonomous driving; and
   control the vehicle to travel along the generated travel route.

2. The electronic control device according to claim 1, wherein the map processing device extracts, from road information included in the map information, a two-way traffic road having no center line as the target road, and calculates the virtual travel routes in opposite directions to each other on a left side and a right side of the target road, and stores the virtual travel routes in the storage device as the travel route information.

3. The electronic control device according to claim 2, wherein the map processing device records the travel route only when the vehicle is traveling on the target road, and classifies the obstacle and updates the travel route information after the vehicle leaves the target road.

4. The electronic control device according to claim 1, wherein the map processing device generates the avoiding route by smoothing the travel route along which the vehicle has avoided the permanent obstacle.

5. A vehicle control system comprising: the electronic control device according to claim 1; and a map information server installed outside the vehicle and connected to the electronic control device in a manner capable of information communication, wherein
 the map information server includes a server storage device that stores map information including the travel route information, a communication device that communicates with the electronic control device, and a server processing device that acquires the travel route information updated from the electronic control device via the communication device and updates the travel route information stored in the server storage device.

6. The vehicle control system according to claim 5, wherein the server processing device extracts, from road information included in the map information stored in the server storage device, a two-way traffic road having no center line as the target road, calculates the virtual travel routes in opposite directions to each other on a right side and a left side of the target road, and causes the server storage device to store the virtual travel routes as the travel route information.

7. The vehicle control system according to claim 6, wherein the map processing device of the electronic control device acquires the map information including the virtual travel route from the map information server and causes the server storage device to store the map information as the map information.

* * * * *